United States Patent
Lee et al.

(10) Patent No.: US 9,007,347 B2
(45) Date of Patent: Apr. 14, 2015

(54) MULTI-TOUCH SENSING DISPLAY APPARATUS

(75) Inventors: Hong-seok Lee, Seongnam-si (KR);
Yong-kweun Mun, Yongin-si (KR);
Jung-woo Kim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1270 days.

(21) Appl. No.: 12/662,643

(22) Filed: Apr. 27, 2010

(65) Prior Publication Data
US 2011/0069039 A1    Mar. 24, 2011

(30) Foreign Application Priority Data
Sep. 23, 2009 (KR) .................. 10-2009-0090230

(51) Int. Cl.
*G06F 3/042* (2006.01)

(52) U.S. Cl.
CPC .... *G06F 3/0425* (2013.01); *G06F 2203/04109* (2013.01)

(58) Field of Classification Search
USPC ............ 345/173–176; 178/18.09, 18.11
See application file for complete search history.

(56) References Cited

U.S. PATENT DOCUMENTS

| | | | |
|---|---|---|---|
| 8,441,467 B2* | 5/2013 | Han | 345/176 |
| 2008/0007541 A1* | 1/2008 | Eliasson et al. | 345/176 |
| 2008/0121442 A1* | 5/2008 | Boer et al. | 178/18.09 |
| 2009/0219261 A1* | 9/2009 | Jacobson et al. | 345/175 |

* cited by examiner

*Primary Examiner* — Yong H Sim
(74) *Attorney, Agent, or Firm* — Harness, Dickey & Pierce, P.L.C.

(57) ABSTRACT

A multi-touch sensing display apparatus is provided. The multi-touch sensing display apparatus may include a back light unit, a display panel, a sensor unit on a display surface of the display panel, and a touch light source unit providing light to be diffused by a touch of a user so that the sensor unit senses the touch of the user. The touch light source unit may include a touch light source and a transparent light guide plate. The transparent light guide plate may include a light guiding unit and a plurality of light emitting units integrally formed with each other as a single body, wherein the light guiding unit guides light from the touch light source to an inside thereof, and the plurality of light emitting units protrudes from the light guiding unit and emits light from the light guiding unit.

18 Claims, 5 Drawing Sheets

MULTI-TOUCH SENSING DISPLAY APPARATUS

CROSS-REFERENCE TO RELATED APPLICATION

This application claims priority under 35 U.S.C. §119 to Korean Patent Application No. 10-2009-0090230, filed on Sep. 23, 2009, in the Korean Intellectual Property Office (KIPO), the disclosure of which is incorporated herein in its entirety by reference.

BACKGROUND

1. Field

Example embodiments relate to multi-touch sensing display apparatuses.

2. Description of the Related Art

Display apparatuses are evolving from apparatuses that simply display information to apparatuses that interact with users. For relatively efficient interaction, display apparatuses include a touch panel for sensing inputs of a user.

A touch panel senses a touch point touched by a finger or a pen input from a front surface of an electronic display apparatus, for example, a computer, a laptop computer, or a portable media player (PMP) and thus is used as a user interface for inputting a specific command or data to the electronic apparatus.

According to an operating principle of the touch panel, touch panels may be classified into optical type, capacitance type, ultrasonic type, resistive film type, and electromagnetic induction type touch panels and a type of touch panel may be used according to its characteristics. For example, optical type and capacitance type touch panels may be used for large-sized displays and resistive film type touch panels may be used for small-sized displays.

A touch panel is generally used as a single point input pointing device instead of a mouse, and recently, development of multi-input devices is being accelerated due to the increasing demand for multi-input devices.

SUMMARY

Example embodiments provide multi-touch sensing display apparatuses.

Additional aspects will be set forth in part in the description which follows and, in part, will be apparent from the description, or may be learned by practice of example embodiments.

In accordance with example embodiments, a multi-touch sensing display apparatus may include a back light unit, a display panel, and sensor unit, and a touch light source unit. In example embodiments, the back light unit may be configured to provide light to form an image and the display panel may be configured to form the image by modulating the light from the back light unit. In example embodiments the sensor unit may be on a display surface of the display panel and the sensor unit may be configured to sense a touch by a user. In example embodiments the touch light source unit may be configured to provide light to be diffused by the touch of the user so that the sensor unit senses the touch of the user. In example embodiments the touch light source unit may include a touch light source and a transparent light guide plate. The transparent light guide plate may include a light guiding unit and a plurality of light emitting units. The light guiding unit may be configured to guide the light from the touch light source to an inside thereof and the plurality of light emitting units may be configured to protrude from the light guiding unit and emit light incident from the light guiding unit. In example embodiments the light guiding unit and the plurality of light emitting units may be integrally formed with each other as a single body.

In accordance with example embodiments, a multi-touch sensing display apparatus may include a back light unit, a display panel, a sensor unit, and a touch light source unit. In example embodiments, the back light unit may be configured to provide light to form an image. In example embodiments, the back light unit may include an image forming light source and a transparent light guide plate including a light guiding unit and a plurality of light emitting units. The light guiding unit may be configured to guide light from the image forming light source to an inside thereof and the plurality of light emitting units may be configured to protrude from the light guiding unit and emit light from the light guiding unit. The light guiding unit and the plurality of light emitting units may be integrally formed with each other as a single body. In example embodiments, the display panel may be configured to form an image by modulating light from the back light unit. Additionally, the sensor unit may be below the back light unit and the sensor unit may be configured to sense a touch by a user. In example embodiments, the touch light source unit may be configured to provide light to be diffused by a touch of a user so that the sensor unit senses the touch of the user.

In accordance with example embodiments, a multi-touch sensing display apparatus may include a back light unit configured to provide light to form an image, a liquid crystal panel configured to form an image by modulating the light from the back light unit, a plurality of sensor-thin film transistors (TFTs) on a TFT layer, the plurality of sensor-thin film transistors (TFTs) including switching device arrays configured to switch pixels of the liquid crystal panel, to sense a touch of a user; and a touch light source unit configured to provide light to be diffused by a touch of a user so that the sensor-TFTs senses a touch of a user. In example embodiments, the back light unit may include an image forming light source and a transparent light guide plate including a light guiding unit and a plurality of light emitting units. The light guiding unit may be configured to guide light from the touch light source to an inside thereof and the plurality of light emitting units may be configured to protrude from the light guiding unit and emit light from the light guiding unit. In example embodiments, the light guiding unit and the plurality of light emitting units may be integrally formed with each other as a single body.

In accordance with example embodiments, a multi-touch sensing display apparatus may include a back light unit for providing light for forming an image, a display panel for forming an image by modulating light from the back light unit, a sensor unit disposed on a display surface of the display panel for sensing a touch by a user, and a touch light source unit for providing light to be diffused by a touch of a user so as for the sensor unit to sense the touch of the user. In example embodiments, the touch light source unit may include a touch light source and a transparent light guide plate. The transparent light guide plate may include a light guiding unit and a plurality of light emitting units. The light guiding unit and the plurality of light emitting units may be integrally formed with each other as a single body and the light guiding unit may guide light incident from the touch light source to the inside thereof. In example embodiments, the plurality of light emitting units may protrude from the light guiding unit and may emit light incident from the light guiding unit.

In example embodiments, the touch light source unit may be interposed between the display panel and the sensor unit.

In example embodiments, the back light unit may include a reflector, a plurality of light sources disposed on the reflector, and at least one optical sheet for diffusing and collimating light irradiated from the plurality of light sources.

In example embodiments, the back light unit may include an image forming light source, and a transparent light guide plate including a light guiding unit and a plurality of light emitting units. The light guiding unit and the plurality of light emitting units may be integrally formed with each other as a single body and the light guiding unit may guide light incident from the image forming light source to the inside thereof. In example embodiments, the plurality of light emitting units may protrude from the light guiding unit and may emit light incident from the light guiding unit.

In example embodiments, the back light unit may include an image forming light source. The image forming light source may be disposed at one side of the transparent light guide plate at which the touch light source is disposed or at another side opposite to the one side of the transparent light guide plate. The touch light source unit may be disposed below the display panel.

In accordance with example embodiments, a multi-touch sensing display apparatus may include a back light unit for providing light for forming an image, a display panel for forming an image by modulating light from the back light unit, a sensor unit disposed below the back light unit for sensing a touch by a user, and a touch light source unit for providing light to be diffused by a touch of a user so as for the sensor unit to sense the touch of the user. In example embodiments, the back light unit may include an image forming light source and a transparent light guide plate including a light guiding unit and a plurality of light emitting units. The light guiding unit and the plurality of light emitting units may be integrally formed with each other as a single body and the light guiding unit may guide light incident from the image forming light source to the inside thereof. In example embodiments, the plurality of light emitting units may protrude from the light guiding unit and may emit light incident from the light guiding unit.

In example embodiments, the touch light source unit may be disposed below the back light unit.

In example embodiments, the touch light source unit may include a reflector and a plurality of touch light sources disposed on the reflector. The sensor unit may include a plurality of sensors disposed on the reflector.

In example embodiments, the touch light source unit may include a touch light source and the touch light source may be disposed at one side of the transparent light guide plate at which the image forming light source is disposed or at another side opposite to the one side of the transparent light guide plate.

In example embodiments, the touch light source unit may include a touch light source and a transparent light guide plate. The transparent light guide plate may include a light guiding unit and a plurality of light emitting units. The light guiding unit and the plurality of light emitting units may be integrally formed with each other as a single body and the light guiding unit may guide light incident from the touch light source to the inside thereof. In example embodiments, the plurality of light emitting units may protrude from the light guiding unit and may emit light incident from the light guiding unit. The touch light source unit may be disposed below the back light unit or on the display surface of the display panel.

In example embodiments, a multi-touch sensing display apparatus may include a back light unit for providing light for forming an image, a liquid crystal panel for forming an image by modulating light from the back light unit, a plurality of sensor-thin film transistors (TFTs) disposed on a TFT layer including switching device arrays for switching pixels of the liquid crystal panel, and for sensing a touch of a user. In example embodiments the touch light source unit may provide light to be diffused by a touch of a user so as for the sensor-TFTs to sense a touch of a user. In example embodiments the back light unit may include an image forming light source and a transparent light guide plate including a light guiding unit and a plurality of light emitting units. The light guiding unit and the plurality of light emitting units may be integrally formed as a single body and the light guiding unit may guide light incident from the touch light source to the inside thereof. In example embodiments the plurality of light emitting units may protrude from the light guiding unit and may emit light incident from the light guiding unit.

In example embodiments, the touch light source unit may include a touch light source and the touch light source may be disposed at one side of the transparent light guide plate at which the image forming light source is disposed or at another side opposite to the one side of the transparent light guide plate.

In example embodiments, the touch light source unit may be disposed below the back light unit and may include a reflector and a plurality of touch light sources disposed on the reflector.

In example embodiments, the touch light source unit may include a touch light source and a transparent light guide plate. The transparent light guide plate may include a light guiding unit and a plurality of light emitting units and the light guiding unit and the plurality of light emitting units may be integrally formed as a single body. In example embodiments, the light guiding unit may guide light incident from the touch light source to the inside thereof and the plurality of light emitting units may protrude from the light guiding unit and may emit light incident from the light guiding unit.

In example embodiments, the touch light source unit may be disposed below the back light unit, or between the display panel and the back light unit, or on the display surface of the display panel.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Example embodiments will now be described more fully with reference to the accompanying drawings, in which example embodiments are shown. The invention may, however, be embodied in different forms and should not be construed as limited to example embodiments set forth herein. Rather, example embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

Hereinafter, example embodiments will be described in more detail with reference to the accompanying drawings. In the drawings, like reference numerals denote like elements and the sizes of elements are exaggerated for clarity.

Figure 1:
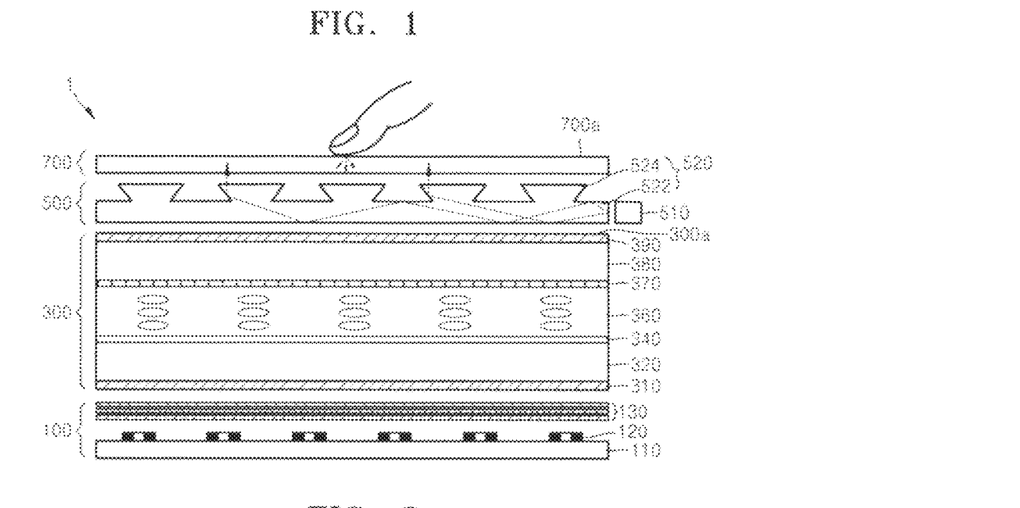
FIG. 1 is a cross-sectional view schematically illustrating a multi-touch sensing display apparatus according to example embodiments.

FIG. 1 is a cross-sectional view schematically illustrating a multi-touch sensing display apparatus 1 according to example embodiments. Referring to FIG. 1, the multi-touch sensing display apparatus 1 may include a back light unit 100, a display panel 300, a sensor unit 700, and a touch light source unit 500. In example embodiments the back light unit 100 may provide light for forming an image, the display panel 300 may form an image by modulating light from the back light unit 100, the sensor unit 700 may be disposed on a display surface 300*a* of the display panel 300 and may sense a touch by a user, and the touch light source unit 500 may provide light to be diffused by a touch of a user so that the sensor unit 700 may sense the touch by the user.

The touch light source unit 500 may include a touch light source 510 and a transparent light guide plate 520. The touch light source 510 may be, for example, an infrared light source. The transparent light guide plate 520 may include a light guiding unit 522 and a plurality of light emitting units 524. In example embodiments, the light guiding unit 522 and the plurality of light emitting units 524 may be integrally formed with each other as a single body. The light guiding unit 522 may be configured to guide light incident from the touch light source 510, and the plurality of light emitting units 524 may protrude from the light guiding unit 522 and may be configured to emit light incident from the light guiding unit 522. That is, light may be totally reflected in the light guiding unit 522. Also, the light may reach the sides of the light emitting units 524 and may be totally reflected and emitted through the light emitting units 524. The transparent light guide plate 520 may be formed of a transparent material, for example, polydimethylsiloxane, which is a transparent and flexible material. Also, in example embodiments, the light guiding unit 522 and the light emitting units 524 may be formed without physical and optical boundaries in order to improve optical characteristics of the light guiding unit 522 and the light emitting units 524. In example embodiments, the number and size of the light emitting units 524 are not limited, and the form and density of the light emitting units 524 may vary according to the distance from the touch light source 510 in consideration of uniformity of light emitted from the light emitting units 524.

In example embodiments, the back light unit 100 may be a direct type back light unit and may include a reflector 110, a plurality of image forming light sources 120, and at least one optical sheet 130. In example embodiments, the plurality of image forming light sources 120 may be formed on the reflector 110 and the at least one optical sheet 130 may diffuse and collimate light irradiated from the plurality of image forming light sources 120. The plurality of image forming light sources 120 may include, for example, a LED device having R, G, and B colors.

The display panel 300 may be, for example, a liquid crystal panel, and may include a first transparent substrate 320, a second transparent substrate 380, and a liquid crystal layer 360 interposed between the first transparent substrate 320 and the second transparent substrate 380. Polarizers 310 and 390 may be formed on the lower surface of the first transparent substrate 320 and the upper surface of the second transparent substrate 380, respectively. Also, a thin film transistor (TFT) layer 340, on which TFTs (not illustrated) are arrayed to switch the liquid crystal layer 360 for each pixel, may be disposed on the first transparent substrate 320. A color filter 370 for forming colors may be disposed on the lower surface of the second transparent substrate 380.

The sensor unit 700 may be configured to sense light diffused by a touch of a user in a touch surface 700a. Accordingly, the sensor unit 700 may sense a touch position. In accordance with example embodiments, the sensor unit 700 may include arrays of a plurality of sensor-TFTs (not illustrated) configured to sense light diffused by the touch of the user and convert the sensed light into electrical signals. The plurality of sensor-TFTs (not illustrated) may be disposed to correspond to a black matrix area of the color filter 370.

In example embodiments, the transparent light guide plate 520 may be employed in the light source unit 500 for light efficiency. For example, if the touch light source 510 is arranged along with the plurality of image forming light sources 120 on the reflector 110, an amount of touch light transmitted to the touch surface 700a may be reduced due to light absorption and diffusion by the plurality of optical sheets 130 and accordingly sensitivity of the touch may be deteriorated. In addition, in order to increase light efficiency, the touch light source unit 500 may be disposed as close as possible to the touch surface 700a and may be transparent due to the transparent light guide plate 520, thereby displaying an image of the display surface 300a to the user.

Due to the structures of the sensor unit 700 and the touch light source unit 500, the user may view displayed images and input by touching the touch surface 700a of the sensor unit 700.

The structure of the back light unit 100 may be changed or the arrangement of the touch light source unit 500 may be changed, as described below with reference to FIGS. 2 and 3.

Figure 2:
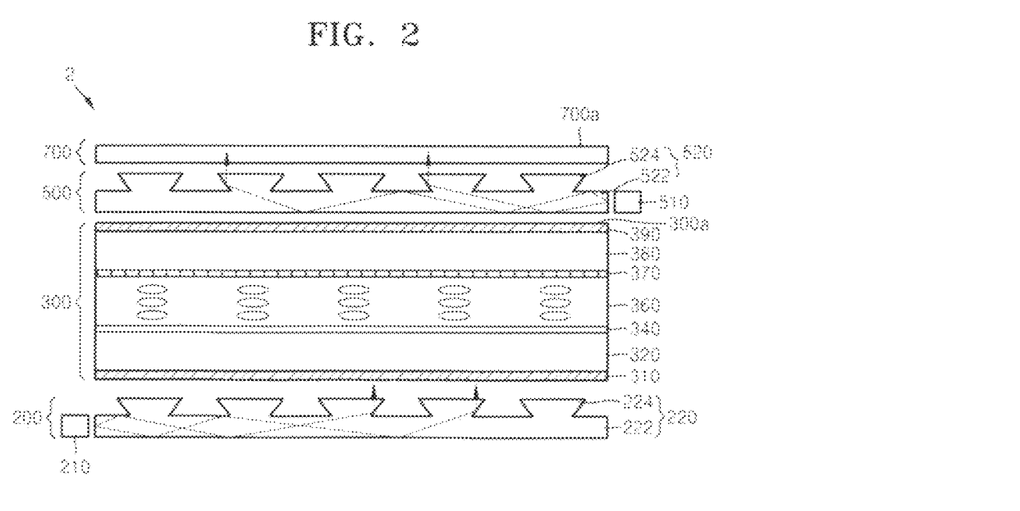
FIG. 2 is a cross-sectional view schematically illustrating a display apparatus according to example embodiments.

FIG. 2 is a cross-sectional view schematically illustrating a display apparatus 2 according to example embodiments. In example embodiments, a back light unit 200 may be formed as an edge type back light unit and thus may be different from the back light unit 100 of FIG. 1. The back light unit 200 may include an image forming light source 210 and a transparent light guide plate 220. The transparent light guide plate 220 may include a light guiding unit 222 and a plurality of light emitting units 224. In example embodiments, the light guiding unit 222 and the light emitting units 224 may be integrally formed with each other as a single body. In example embodiment, the light guiding unit 222 may guide light incident from the image forming light source 210 to the inside thereof, and the plurality of light emitting units 224 may protrude from the light guiding unit 222 and emit light incident from the light guiding unit 222. As illustrated in FIG. 2, the back light unit 200 may include the transparent light guide plate 220, however, example embodiments are not limited thereto. For example, the back light unit 200 may include a general light guide plate.

Figure 3:
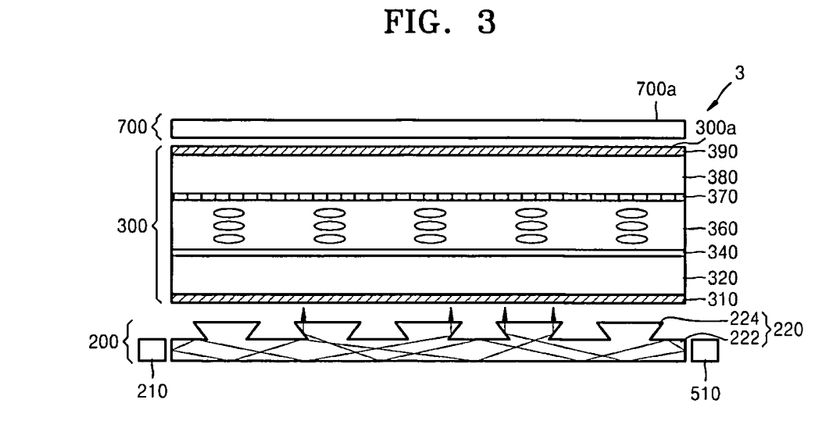
FIG. 3 is a cross-sectional view schematically illustrating a display apparatus according to example embodiments.

FIG. 3 is a cross-sectional view schematically illustrating a display apparatus 3 according to example embodiments. The example display apparatus 3, as illustrated in FIG. 3, is different from the example display apparatus 2, as illustrated in FIG. 2, in that the transparent light guide plate 220 illustrated in FIG. 3 may be used when light from the touch light source 510 and the image forming light source 210 is emitted toward the display panel 300. The back light unit 200 may include the image forming light source 210 and the transparent light guide plate 220 and the touch light source 510 may be disposed at one side of the transparent light guide plate 220 so as to emit light through the transparent light guide plate 220. As shown in FIG. 3, the touch light source 510 and the image forming light source 210 may be disposed at both sides, e.g., at two ends, of the transparent light guide plate 220, respectively, and thus may face each other with the transparent light guide plate 220 disposed therebetween. However, example embodiments are not limited thereto and the touch light source 510 and the image forming light source 210 may be disposed at the same side of the transparent light guide plate 220. Also, a plurality of touch light sources 510 and image forming light sources 210 may be formed in a repeatedly alternating manner along one side or both sides of the transparent light guide plate 220. The touch light source 510 and the transparent light guide plate 220 may constitute a touch light source unit and light from the touch light source 510 may be emitted to the display panel 300 through the transparent light guide plate 220. In example embodiments, light may be emitted from the back light unit 200 and may be modulated in the display panel 300 and thus images may be formed, and light from the touch light source unit may be transmitted to the touch surface 700a for a touch input by a user.

Figure 4:
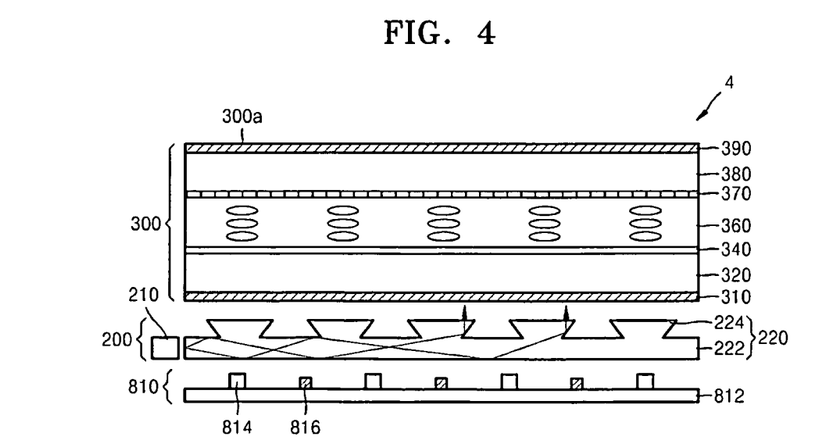
FIG. 4 is a cross-sectional view schematically illustrating a display apparatus according to example embodiments.
Figure 5:
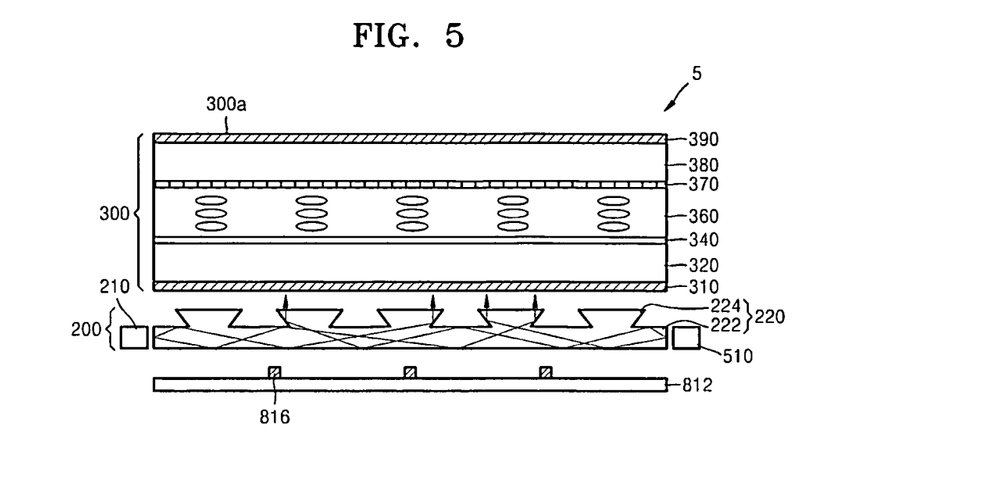
FIG. 5 is a cross-sectional view schematically illustrating a display apparatus according to example embodiments.
Figure 6:
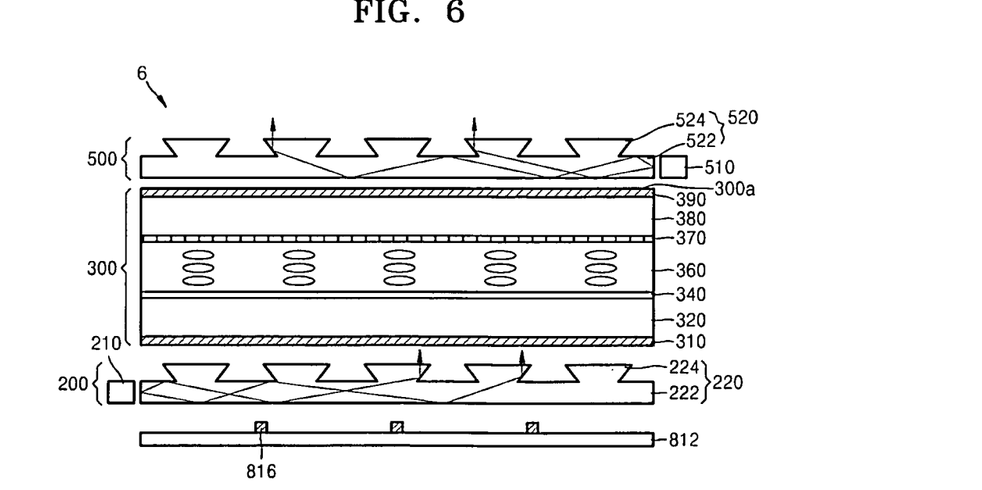
FIG. 6 is a cross-sectional view schematically illustrating a display apparatus according to example embodiments.

Example display apparatuses 4, 5, and 6, as illustrated in FIGS. 4 through 6, may include sensors 816 for sensing a touch of a user below the display panel 300.

Referring to FIG. 4, the display apparatus 4 illustrated in FIG. 4 according to example embodiments may include the back light unit 200, the display panel 300, a sensor unit, and a touch light source unit 810. In example embodiments, the back light unit 200 may provide light for forming an image and the display panel 300 may form an image by modulating light from the back light unit 200. As shown in FIG. 4, the sensor unit may be disposed below the back light unit 200. In example embodiments, the sensor unit may be configured to sense a touch by a user, and the touch light source unit 810 may be configured to provide light to be diffused by a touch of a user so that the sensor unit may sense the touch by the user.

As shown in FIG. 4, the back light unit 200 may include the image forming light source 210 and the transparent light guide plate 220. The transparent light guide plate 220 may include the light guiding unit 222 and the plurality of light emitting units 224. In example embodiments, the light guiding unit 222 and the plurality of light emitting units 224 may be integrally formed with each other as a single body. Further, the light guiding unit 222 may be configured to guide light incident from the image forming light source 210 to the inside thereof, and the plurality of light emitting units 224 may be configured to protrude from the light guiding unit 222 and emit light incident from the light guiding unit 222. In example embodiments, the touch light source unit 810 may be disposed below the back light unit 200 and may include a reflector 812 and a plurality of touch light sources 814 disposed on the reflector 812. As shown in FIG. 4, the sensor unit may include a plurality of sensors 816 disposed on the reflector 812. Further, each of the touch light sources 814 may be an infrared light source and each of the sensors 816 may be an infrared camera.

The transparent light guide plate 220 included in the back light unit 200 may emit light collimated with a uniform light distribution by the light emitting units 224 so that a separate optical sheet for diffusing or collimating light may not be needed and thus the back light unit 200 may have a transparent property. Accordingly, light from the touch light source unit 810 disposed below the back light unit 200 may reach a touch surface without loss of light and light diffused by a touch of a user may be sensed by the sensors 816. In this example, the touch surface is a display surface 300a.

The example display apparatus 5 of FIG. 5 is a modification of the example display device 4 of FIG. 4 in terms of the arrangement of the touch light source 510. Referring to FIG. 5, the touch light source 510 may be disposed at one side of the transparent light guide plate 220. Accordingly, the transparent light guide plate 200 may be used when light from the image forming light source 210 and the touch light source 510 is emitted toward the display panel 300. That is, the image forming light source 210 and the transparent light guide plate 220 constitute the back light unit 200 and the touch light source 510 and the transparent light guide plate 220 constitute a touch light source unit. In FIG. 5, the touch light source 510 faces the image forming light source 210 with the transparent light guide plate 220 disposed therebetween. However, example embodiments are not limited thereto and the touch light source 510 and the image forming light source 210 may be disposed at the same side of the transparent light guide plate 220. Also, a plurality of touch light sources 510 and image forming light sources 210 may be formed in a repeatedly alternating manner along one side or both sides of the transparent light guide plate 220.

The example display apparatus 6 of FIG. 6 is a modification of the example display device 5 of FIG. 5. In this regard, the touch light source unit 500 may be disposed on the display surface 300a of the display panel 300. The touch light source unit 500 may include the touch light source 510 and the transparent light guide plate 520. The transparent light guide plate 520 may include the light guiding unit 522 and the plurality of light emitting units 524. In example embodiments, the light guiding unit 522 and the plurality of light emitting units 524 may be integrally formed with each other as a single body. The light guiding unit 522 may be configured to guide incident light to the inside thereof, and the plurality of light emitting units 524 may be configured to protrude from the light guiding unit 522 and emit light incident from the light guiding unit 522. In example embodiments, the upper surface of the light emitting units 524 may be a touch surface. Although not illustrated, a transparent pad for inputting a touch may be formed on the transparent light guide plate 520.

Alternatively, the touch light source unit 500 may be interposed between the back light unit 200 and the sensor unit.

Example display apparatuses 7 through 10, as illustrated in FIGS. 7 through 10, may include a sensor unit disposed on a TFT layer of a liquid display panel 400.

Figure 7:
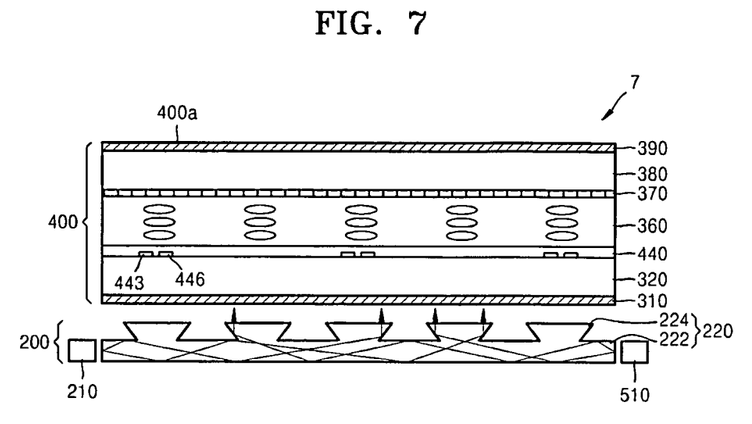
FIG. 7 is a cross-sectional view schematically illustrating a display apparatus according to example embodiments.

Referring to FIG. 7, the display apparatus 7 according to example embodiments may include the back light unit 200, the liquid display panel 400, a plurality of sensor-TFTs 446, and a touch light source unit. In example embodiments, the back light unit 200 may provide light for forming an image and the liquid display panel 400 may form images by modulating light from the back light unit 200. A plurality of sensor-TFTs 446 may be formed on the TFT layer 440 and may sense a touch of a user. In example embodiments, the touch light source unit may provide light to be diffused by the touch of the user and the plurality of sensor-TFTs 446 may sense the touch of the user. The TFT layer 440 may include switching-TFTs 443 which are devices for switching pixels. The sensor-TFTs 446 may be configured to sense light diffused by a touch of a user and convert the sensed light into electrical signals and the sensor-TFTs 446 may be included in the TFT layer 440. Accordingly, the example display apparatus 7 may have a relatively compact structure.

The back light unit 200 may include the image forming light source 210 and the transparent light guide plate 220. The transparent light guide plate 220 may include the light guiding unit 222 and the plurality of light emitting units 224. In example embodiments, the light guiding unit 222 and the plurality of light emitting units 224 may be integrally formed with each other as a single body. In example embodiments, the light guiding unit 222 may be configured to guide light incident from the image forming light source 210 to the inside thereof, and the plurality of light emitting units 224 may be configured to protrude from the light guiding unit 222 and emit light incident from the light guiding unit 222. The touch light source 510 may be disposed at one side of the transparent light guide plate 220 so that the transparent light guide plate 200 may be used when light from the image forming light source 210 and the touch light source 510 is emitted to the display panel 300. That is, the image forming light source 210 and the transparent light guide plate 220 may constitute the back light unit 200 and the touch light source 510 and the transparent light guide plate 220 constitute the touch light source unit.

In FIG. 7, the touch light source 510 may face the image forming light source 210 with the transparent light guide plate 220 disposed therebetween. However, example embodiments are not limited thereto and the touch light source 510 and the image forming light source 210 may be disposed at the same side of the transparent light guide plate 220. Also, a plurality of touch light sources 510 and image forming light sources 210 may be formed in a repeatedly alternating manner along one side or both sides of the transparent light guide plate 220.

In example embodiments, the sensor-TFTs 446 may be embedded in the TFT layer 440 of the liquid display panel 400. In addition, the touch light source unit and the back light unit 200 may share the transparent light guide plate 220 and thus the display apparatus 7 may have a relatively compact structure. In FIG. 7, the numbers of the sensor-TFTs 446 and the switching-TFTs 443 are the same. However, example embodiments are not limited thereto and the number may be appropriately adjusted by considering various factors, for example, sensitivity.

Figure 8:
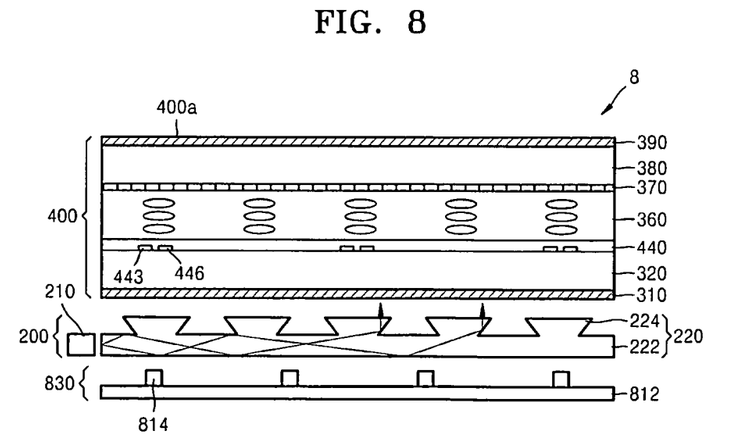
FIG. 8 is a cross-sectional view schematically illustrating a display apparatus according to example embodiments.

FIG. 8 is a cross-sectional view schematically illustrating an example display apparatus 8 according to example embodiments. In FIG. 8, the arrangement and structure of a touch light source unit 830 is different from the touch light source unit of FIG. 7. In accordance with FIG. 8, the example touch light source unit 830 may be disposed below the back light unit 200 and may include the reflector 812 and a plurality of touch light sources 814. As shown in FIG. 8, the plurality of touch light sources 814 may be formed on the reflector 812. Light from the touch light source unit 830 may pass through the transparent back light unit 200 and may reach a touch surface. In FIG. 8, the touch surface may correspond to a display surface 400a, and a touch of a user may be sensed by the sensor-TFTs 446.

Figure 9:
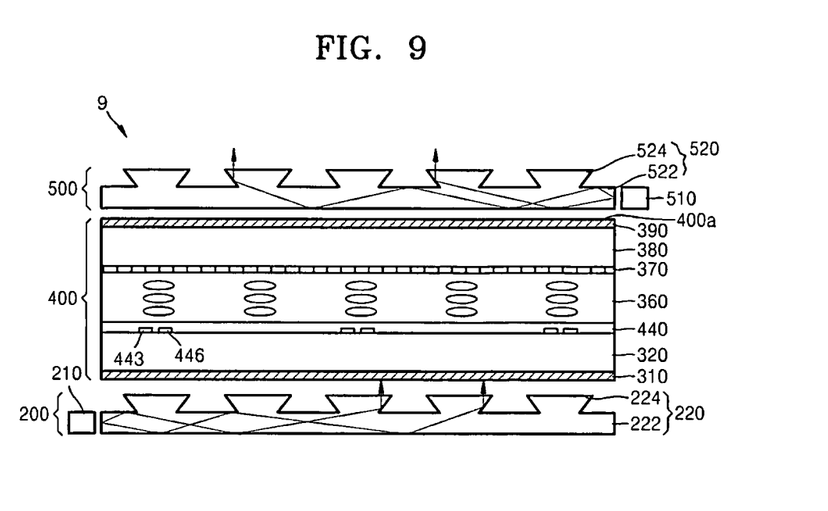
FIG. 9 is a cross-sectional view schematically illustrating a display apparatus according to example embodiments.

FIG. 9 is a cross-sectional view schematically illustrating a display apparatus 9 according to example embodiments. In FIG. 9, the arrangement and structure of the touch light source unit 500 is different from that of the touch light source unit 830 of FIG. 8. In accordance with FIG. 9, the touch light source unit 500 may be disposed on the display surface 400a of the liquid crystal panel 400 and may include the touch light source 510 and the transparent light guide plate 520. The upper surface of the light emitting units 524 of the transparent light guide plate 520 may be a touch surface. Although not illustrated, a transparent pad for inputting a touch may be formed on the transparent light guide plate 520.

Figure 10:
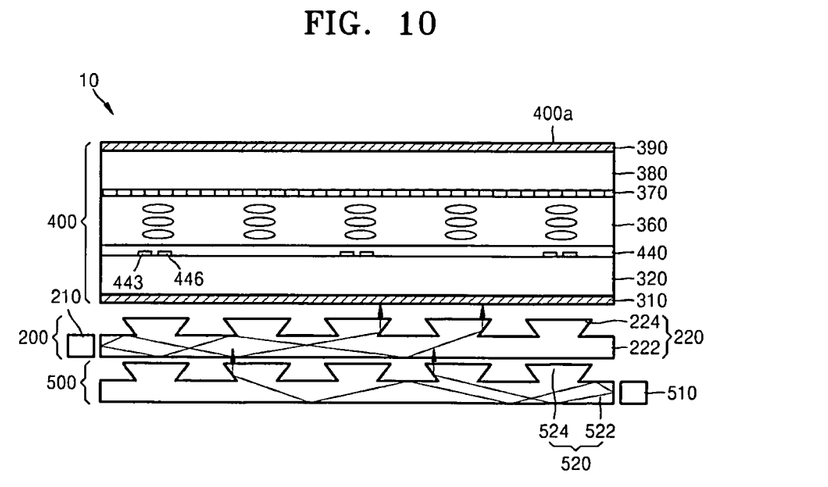
FIG. 10 is a cross-sectional view schematically illustrating a display apparatus according to example embodiments.

FIG. 10 is a cross-sectional view schematically illustrating a display apparatus 10 according to example embodiments. The display apparatus 10 illustrated in FIG. 10 is different from the display apparatus 9 of FIG. 9 in that the touch light source unit 500 is disposed below the back light unit 200. In FIG. 9, the touch light source unit 500 may include the transparent light guide plate 520. In example embodiments, because the touch light source unit 500 of FIG. 10 may be disposed at the bottom of the display apparatus 10, the touch light source unit 500 may include a general light guide plate instead of the transparent light guide plate 520.

According to example embodiments, the touch light source unit 500 may be interposed between the liquid display panel 400 and the back light unit 200. That is, the locations of the touch light source unit 500 and the back light unit 200 may be interchanged with each other. In example embodiments, the back light unit 200 may be disposed at the bottom, may include a general light guide plate instead of the transparent light guide plate 220, and may be formed as a direct type back light unit.

As described above, according to example embodiments, the display apparatuses may include touch light sources and sensor units and thus may sense multi-input by a user. In addition, a transparent light guide plate may be included in at least one of the back light unit and the touch light source unit which provide light for sensing a touch by a user, and thus light efficiency may be relatively high.

It should be understood that example embodiments described therein should be considered in a descriptive sense only and not for purposes of limitation. Descriptions of features or aspects within example embodiments should typically be considered as available for other similar features or aspects in other embodiments.

What is claimed is:

1. A multi-touch sensing display apparatus comprising:
a back light unit configured to provide light to form an image, and including an image forming light source;
a display panel configured to form the image by modulating the light from the back light unit;
a sensor unit on a display surface of the display panel, the sensor unit being configured to sense a touch by a user; and
a touch light source unit configured to provide the light to be diffused by the touch of the user so that the sensor unit senses the touch of the user, and including a touch light source,
wherein the touch light source unit includes a transparent light guide plate,
the transparent light guide plate including a light guiding unit and a plurality of light emitting units, the light guiding unit being configured to guide light from a light source to an inside thereof and the plurality of light emitting units being configured to protrude from the light guiding unit and emit light from the light guiding unit, and the light guiding unit and the plurality of light emitting units are integrally formed with each other as a single body, and the plurality of light emitting units is between the light guiding unit and the sensor unit and is configured to face the sensor unit.

2. The apparatus of claim 1, wherein the touch light source unit includes the transparent light guide plate and is between the display panel and the sensor unit.

3. The apparatus of claim 2, wherein the back light unit includes
a reflector,
a plurality of light sources on the reflector, and
at least one optical sheet configured to diffuse and collimate light from the plurality of light sources.

4. The apparatus of claim 2, wherein the back light unit includes
a second transparent light guide plate including a second light guiding unit and a second plurality of light emitting units, the second light guiding unit being configured to guide light from the image forming light source to an inside thereof and the second plurality of light emitting units being configured to protrude from the second light guiding unit and emit light from the second light guiding unit, and the second light guiding unit and the second plurality of light emitting units are integrally formed with each other as a single body.

5. The apparatus of claim 1, wherein the touch light source unit includes the transparent light guide plate and is below the display panel.

6. The apparatus of claim 1, wherein the touch light source unit includes the transparent light guide plate and the image forming light source is disposed at one side of the transparent light guide plate at which the touch light source is disposed and at another side opposite to the one side of the transparent light guide plate.

7. The apparatus of claim 1, wherein the sensor unit includes arrays of a plurality of sensor-thin film transistors (TFTs) configured to sense light diffused by the touch of the user and convert the sensed light into an electrical signal.

8. The apparatus of claim 7, wherein the plurality of sensor-TFTs are arranged to correspond to a black matrix area of the display panel.

9. The apparatus of claim 1, wherein the back light unit includes a second transparent light guide plate, the second transparent light guide plate including a second light guiding unit and a second plurality of light emitting units, the second light guiding unit being configured to guide light from the touch light source to an inside thereof and the second plurality of light emitting units being configured to protrude from the second light guiding unit and emit light from the second light guiding unit, the second light guiding unit and the second plurality of light emitting units being integrally formed with each other as a single body.

10. The apparatus of claim 9, wherein the touch light source unit is below the back light unit.

11. The apparatus of claim 1, wherein:
the display panel includes a liquid crystal panel;
the sensor unit includes a plurality of sensor-thin film transistors (TFTs) on a TFT layer, the TFT layer including switching device arrays configured to switch pixels of the liquid crystal panel; and
the back light unit includes the transparent light guide plate.

12. The apparatus of claim 11, wherein the touch light source is disposed at one of a one side of the transparent light guide plate at which the image forming light source is disposed and at another side opposite to the one side of the transparent light guide plate.

13. The apparatus of claim 11, wherein the touch light source unit includes a second transparent light guide plate, the second transparent light guide plate including a second light guiding unit and a second plurality of light emitting units, the second light guiding unit being configured to guide light from the touch light source to an inside thereof and the second plurality of light emitting units being configured to protrude from the second light guiding unit and emit light from the second light guiding unit, the second light guiding unit and the second plurality of light emitting units being integrally formed with each other as a single body.

14. The apparatus of claim 13, wherein the touch light source unit is one of below the back light unit and between the display panel and the back light unit.

15. The apparatus of claim 1, wherein the light guiding unit is a portion of the at least one of the backlight unit and the touch light unit.

16. The apparatus of claim 1, wherein the touch light source unit is between the sensor unit and the display panel.

17. The apparatus of claim 3, wherein the plurality of light sources is arranged between the reflector and the at least one optical sheet.

18. The apparatus of claim 1, wherein the plurality of protruded light emitting units faces substantially an entire surface of the sensor unit.

* * * * *